United States Patent
Hjelm (10) Patent No.: US 12,498,990 B2
(45) Date of Patent: Dec. 16, 2025

(54) MIGRATION OF VNFS TO VIMS

(71) Applicant: Telefonaktiebolaget LM Ericsson (publ), Stockholm (SE)

(72) Inventor: Johan Hjelm, Matsunami (JP)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 517 days.

(21) Appl. No.: 17/785,250

(22) PCT Filed: Dec. 20, 2019

(86) PCT No.: PCT/SE2019/051328
§ 371 (c)(1),
(2) Date: Jun. 14, 2022

(87) PCT Pub. No.: WO2021/126033
PCT Pub. Date: Jun. 24, 2021

(65) Prior Publication Data
US 2023/0008683 A1    Jan. 12, 2023

(51) Int. Cl.
*G06F 9/50* (2006.01)
*G06F 9/455* (2018.01)
(Continued)

(52) U.S. Cl.
CPC ........ *G06F 9/5077* (2013.01); *G06F 9/45558* (2013.01); *G06F 9/4856* (2013.01);
(Continued)

(58) Field of Classification Search
CPC .................................................... G06F 9/5077
See application file for complete search history.

(56) References Cited

U.S. PATENT DOCUMENTS 9,760,391 B2    9/2017  Kiess et al.
10,291,543 B1   5/2019  Felstaine et al.
(Continued)

FOREIGN PATENT DOCUMENTS

CN    106657173 A    5/2017
WO    2018056873 A1  3/2018

OTHER PUBLICATIONS

European Search Report dated Nov. 21, 2022 for Application No. 19956639.9, consisting of 8 pages.
(Continued)

*Primary Examiner* — James J Debrow
(74) *Attorney, Agent, or Firm* — Weisberg I.P. Law, P.A.

(57) ABSTRACT

Mechanisms for migration in a communication network of VNFs to VIMs. A method is performed by a migration controller. The method includes obtaining information of network complexity per VNF, information of VM usage per VNF, and information of processing capacity of compute nodes per VIM. The method further includes determining a mapping between the VNFs and the VIMs. The mapping defines at which of the VIMs each of the VNFs is instantiable. The method further includes ordering the VNFs in a list by matching the information of network complexity per VNF and the information of VM usage per VNF to the information of processing capacity of compute nodes per VIM and taking into account the mapping between the VNFs and the VIMs. The method further includes initiating migration of the VNFs to the VIMs in the order defined by the list.

20 Claims, 8 Drawing Sheets

(51) Int. Cl.
  *G06F 9/48* (2006.01)
  *H04L 41/0816* (2022.01)
  *H04L 41/0823* (2022.01)
  *H04L 41/0897* (2022.01)

(52) U.S. Cl.
  CPC ...... *H04L 41/0816* (2013.01); *H04L 41/0823* (2013.01); *H04L 41/0897* (2022.05); *G06F 2009/4557* (2013.01)

(56) References Cited

U.S. PATENT DOCUMENTS

| | | | |
|---|---|---|---|
| 2015/0277779 A1* | 10/2015 | Devarapalli et al. | ........................ G06F 3/0611 |
| 2017/0017512 A1 | 1/2017 | Csatari et al. | |
| 2017/0063714 A1 | 3/2017 | Xiang | |
| 2017/0220371 A1 | 8/2017 | Kosugi et al. | |
| 2018/0081714 A1 | 3/2018 | Liu | |
| 2018/0246757 A1 | 8/2018 | Li et al. | |
| 2018/0337981 A1 | 11/2018 | Bogdan et al. | |
| 2019/0065234 A1 | 2/2019 | Zembutsu et al. | |
| 2019/0146827 A1* | 5/2019 | Yu et al. | ............. G06F 9/45558 |
| 2020/0195558 A1* | 6/2020 | Schultz et al. | ......... H04L 47/125 |
| 2020/0401456 A1* | 12/2020 | Sivak et al. | .......... G06F 9/5077 |
| 2024/0036905 A1* | 2/2024 | Rathinam et al. | .. G06F 9/45558 |

OTHER PUBLICATIONS

Jun Zhao; Research and optimization of OpenStack virtual machine resource scheduling technology; International Journal of Circuits, Systems and Signal Processing; vol. 13, 2019, consisting of 7 pages.

International Search Report and Written Opinion dated Oct. 9, 2020 for International Application No. PCT/SE2019/051328 filed Dec. 12, 2019, consisting of 10 pages.

Chinese Office Action and English Summary dated Jul. 26, 2025 for Application No. 201980103078.7, consisting of 9 pages.

* cited by examiner

MIGRATION OF VNFS TO VIMS

CROSS-REFERENCE TO RELATED APPLICATION

This application is a Submission Under 35 U.S.C. § 371 for U.S. National Stage Patent Application of International Application Number: PCT/SE2019/051328, filed Dec. 20, 2019 entitled "MIGRATION OF VNES TO VIMS," the entirety of which is incorporated herein by reference.

TECHNICAL FIELD

Embodiments presented herein relate to a method, a migration controller, a computer program, and a computer program product for migration in a communication network of virtual network functions (VNFs) to virtual infrastructure managers (VIMs).

BACKGROUND

In computing, a virtual machine (VM) is an emulation of a computer system. VMs are based on computer architectures and provide functionality of a physical computer. Their implementations may involve specialized hardware, software, or a combination thereof. VMs generally are software programs which present the same interfaces as a physical computer.

There are many applications for VMs. One example is for providing computational support in core network nodes in cellular telecommunication systems. A single core network node might comprise several types of VMs which operate together.

Cooperating VMs and the virtual networks connecting them form what is commonly known as VNF.

When the VNF are deployed in the actual computers, this deployment generally takes place over multiple physical machines, or compute nodes. One or more such compute node might be managed by a VIM. In systems with multiple VIMs (or other means to coordinate the compute nodes, such as container managers, e.g. Kubernetes), one issue concerns how to deploy the VNF in the most optimal way. This is commonly handled by a separate node, referred to as an orchestrator.

In a system where records are held of VMs, the VMs can be operating separately from the record of them, and will not be affected by changes in the record keeping. In general terms, the only time the VM and their records are interacted with simultaneously is when the VM started, stopped, instantiated (either at the time of instantiation of the VNF, or at a separate time such as a scaling operation), when the VM is changed (which can be done as scaling in and scaling out, where the processor and/or memory capacity of the VM may be changed, or when the configuration is changed, such that a new network is added or the address of the VM changes as a result of the VM being moved to a different physical equipment), or when the VM is terminated.

If a change occurs such that the records of the VM will have to change due to e.g. a database management system (DBMS) upgrade, the records detailing the VM will have to be changed as well, for example to adapt to the format of the new DBMS.

When performing such a change, the orchestrator might need to query the VM for its configuration, for example to know if the configuration has, the original record was created, changed in such a way that it needs to be integrated in the updated record.

However, when a large number of VMs, or VNFs, have to be migrated, and there is a requirement to verify some or all information in the infrastructure (such as in the VIMs) where the VMs, or VNFs, are deployed, there is a risk of a considerable load on the VIMs as queries regarding all aspects of the VMs and the VNFs they constitute have to be serviced. While such queries can hardly be avoided, they can be distributed in such a way to avoid peak loads on the VIM, but rather a constant background load.

This can be achieved in several ways, e.g. by traffic shaping the requests, but this is problematic since one request can easily decompose into several subsequent requests which have to be serviced in the scope of the original request. I.e. the VM can be attached to one or more networks, where each network, or VNF, has to be queried for their constituent virtual network adapters, and those virtual network adapters have to be queried for their attached VM, and so on.

Hence, there is still a need for an improved handling of migrating VNFs in a communication network.

SUMMARY

An object of embodiments herein is to provide efficient migration in a communication network of VNFs to VIMs.

According to a first aspect there is presented a method for migration in a communication network of VNFs to VIMs. The method is performed by a migration controller. The method comprises obtaining information of network complexity per VNF, information of VM usage per VNF, and information of processing capacity of compute nodes per VIM. The method comprises determining a mapping between the VNFs and the VIMs. The mapping defines at which of the VIMs each of the VNFs is instantiable. The method comprises ordering the VNFs in a list by matching the information of network complexity per VNF and the information of VM usage per VNF to the information of processing capacity of compute nodes per VIM and taking into account the mapping between the VNFs and the VIMs. The method comprises initiating migration of the VNFs to the VIMs in the order defined by the list.

According to a second aspect there is presented a migration controller for migration in a communication network of VNFs to VIMs. The migration controller comprises processing circuitry. The processing circuitry is configured to cause the migration controller to obtain information of network complexity per VNF, information of VM usage per VNF, and information of processing capacity of compute nodes per VIM. The processing circuitry is configured to cause the migration controller to determine a mapping between the VNFs and the VIMs. The mapping defines at which of the VIMs each of the VNFs is instantiable. The processing circuitry is configured to cause the migration controller to order the VNFs in a list by matching the information of network complexity per VNF and the information of VM usage per VNF to the information of processing capacity of compute nodes per VIM and taking into account the mapping between the VNFs and the VIMs. The processing circuitry is configured to cause the migration controller to initiate migration of the VNFs to the VIMs in the order defined by the list.

According to a third aspect there is presented a migration controller for migration in a communication network of VNFs to VIMs. The migration controller comprises an obtain module configured to obtain information of network complexity per VNF, information of VM usage per VNF, and information of processing capacity of compute nodes per VIM. The migration controller comprises a determine module configured to determine a mapping between the VNFs and the VIMs. The mapping defines at which of the VIMs each of the VNFs is instantiable. The migration controller comprises an order module configured to order the VNFs in a list by matching the information of network complexity per VNF and the information of VM usage per VNF to the information of processing capacity of compute nodes per VIM and taking into account the mapping between the VNFs and the VIMs. The migration controller comprises an initiate module configured to initiate migration of the VNFs to the VIMs in the order defined by the list.

According to a fourth aspect there is presented a computer program for migration in a communication network of VNFs to VIMs, the computer program comprising computer program code which, when run on a migration controller, causes the migration controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient migration in a communication network of VNFs to VIMs.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

As disclosed above there is a need for improved handling of migrating VNFs in a communication network.

In further detail, current mechanisms for handling such migration do not enable optimization of queries to external entities on which database objects have a dependency, such as the VIM. Current mechanisms for making VIM requests do not make any effort at optimizing the request volume dependent on interlinked components. This can be especially problematic if there are multiple VNFs which span multiple VIMs.

Figure 1:
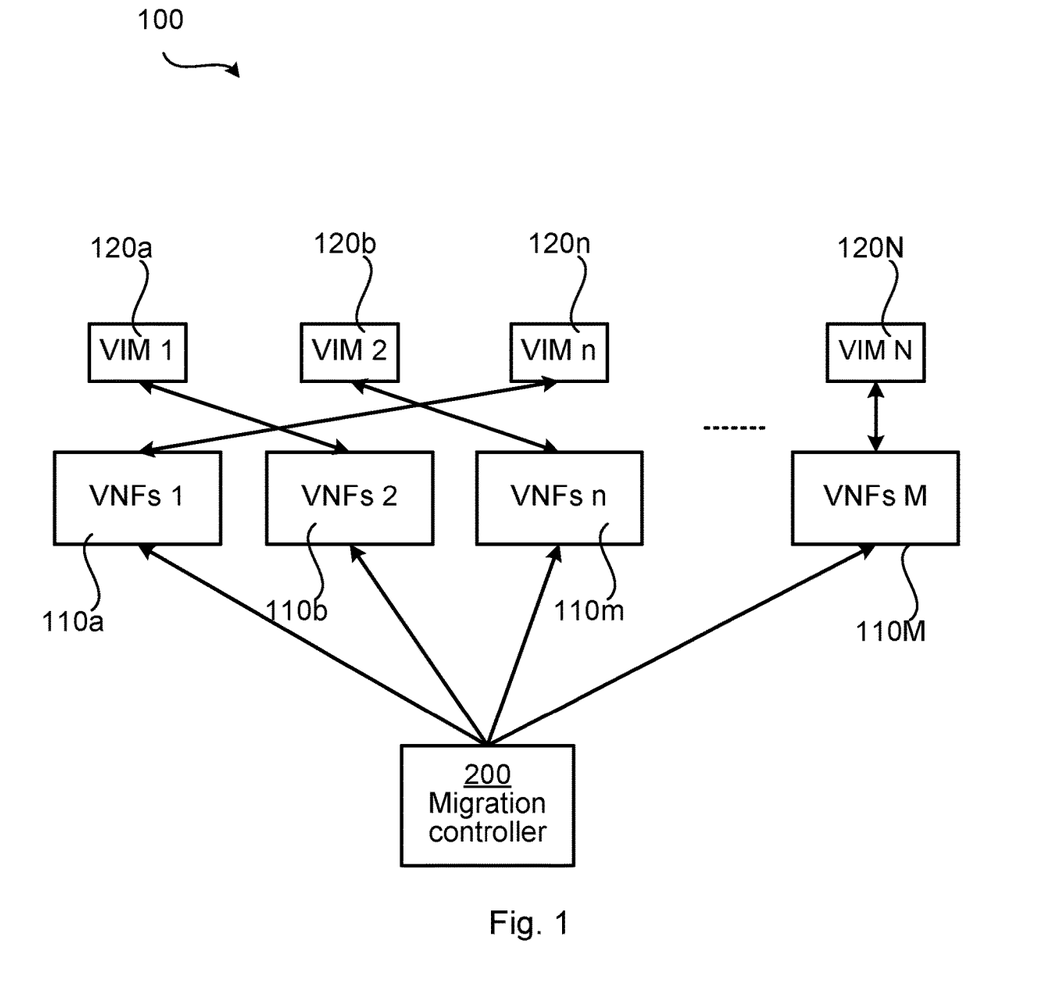
FIG. 1 is a schematic diagram illustrating a communication network according to embodiments.

FIG. 1 is a schematic diagram illustrating a communication network 100 where a migration controller 200 is configured for migration of VNFs 110a:110M to VIMs 120a: 120N. According to the illustrative example of FIG. 1, "VNFs 1" are to be migrated to "VIM n" and so on. As will be disclosed below, the migration controller 200 is configured to create a list according to which the VNFs 110a:110M are migrated to the VIMs 120a:120N such that the VNFs 110a:110M are migrated to the VIMs 120a:120N according to computational need of the VNFs 110a:110M, the amount of VMs per VNF, computational resources of the VIMs 120a:120N, etc. and also the order according to which the VNFs 110a:110M are to be migrated to the VIMs 120a: 120N. This enables equalizing the load, or processing time, etc., among the VIMs 120a:120N. In some aspects, the VNFs 110a:110MN and/or the VIMs 120a:120N are grouped such that there are equally many VNFs and VIMs, i.e., where N=M.

The embodiments disclosed herein in particular relate to mechanisms for migration in a communication network 100 of VNFs 110a:110M to VIMs 120a:120N. In order to obtain such mechanisms there is provided a migration controller 200, a method performed by the migration controller 200, a computer program product comprising code, for example in the form of a computer program, that when run on a migration controller 200, causes the migration controller 200 to perform the method.

Figure 2:
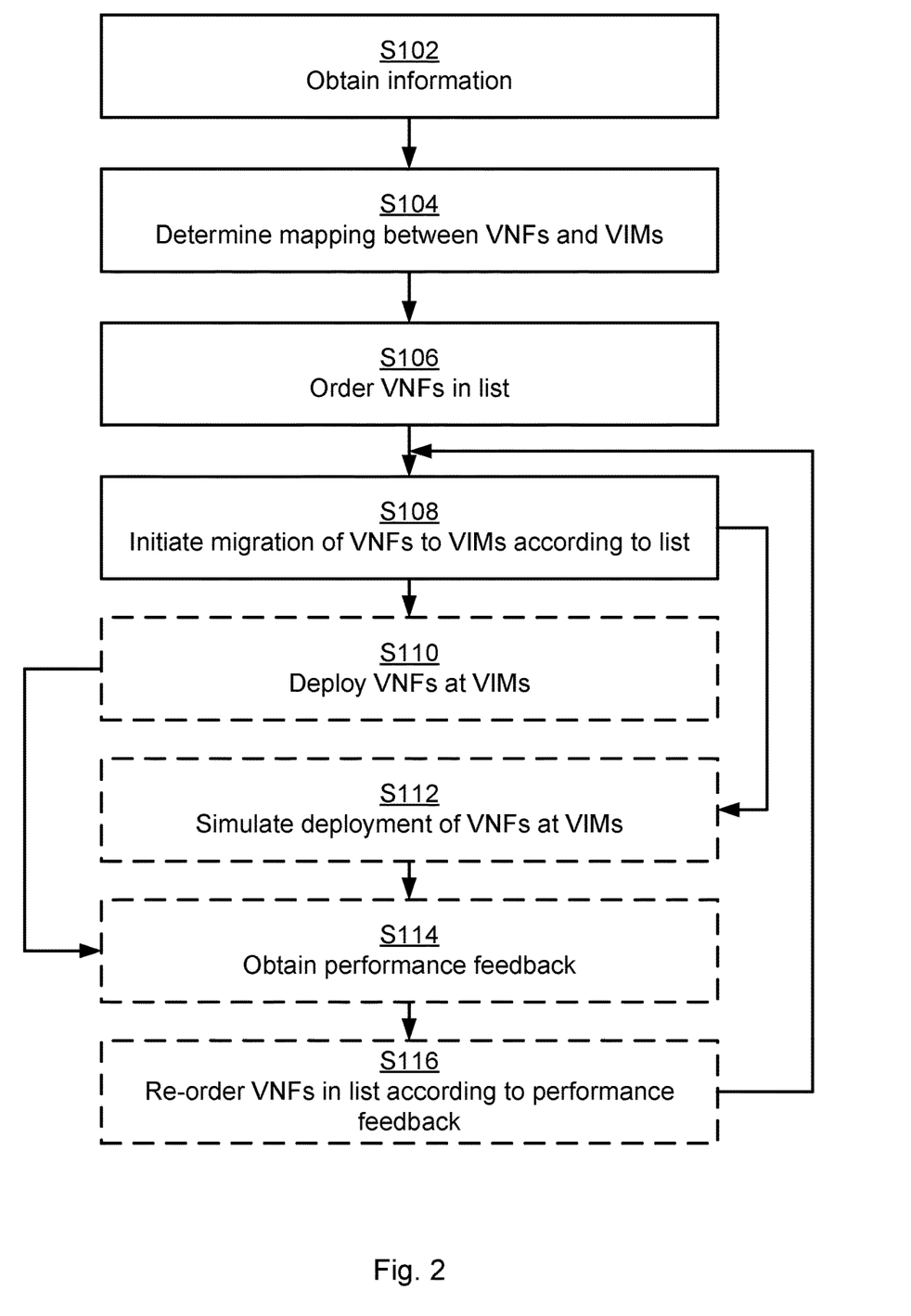
FIGS. 2 and 5 are flowcharts of methods according to embodiments.

FIG. 2 is a flowchart illustrating embodiments of methods for migration in a communication network 100 of VNFs 110a:110M to VIMs 120a:120N. The methods are performed by the migration controller 200. The methods are advantageously provided as computer programs 1020.

S102: The migration controller 200 obtains information of network complexity per VNF, information of VM usage per VNF, and information of processing capacity of compute nodes per VIM. Examples of such information will be provided below.

S104: The migration controller 200 determines a mapping between the VNFs 110a:110M and the VIMs 120a:120N. The mapping defines at which of the VIMs 120a:120N each of the VNFs 110a:110M is instantiable. In this respect, it is assumed that each VNF 110a:110M is instantiable at at least one of the VIMs 120a:120N.

S106: The migration controller 200 orders the VNFs 110a:110M in a list by matching the information of network complexity per VNF and the information of VM usage per VNF to the information of processing capacity of compute nodes per VIM. When performing the matching, the migration controller 200 takes into account the mapping between the VNFs 110a:110M and the VIMs 120a:120N. The latter ensures that a VNF 110a:110M is not matched to a VIM 120a:120N where the VNF 110a:110M is not instantiable. The migration controller 200 is thereby configured to determine which VNFs 110a:110M are to be migrated to which VIMs 120a:120N and also the order in which the VNFs 110a:110M are to be migrated to the VIMs 120a:120N. Further aspects of how the matching might be performed will be provided below.

S108: The migration controller 200 initiates migration of the VNFs 110a:110M to the VIMs 120a:120N in the order defined by the list. Aspects of further actions that might be performed once the migration of the VNFs 110a:110M to the VIMs 120a:120N has been initiated will be disclosed below.

The migration controller 200 thereby minimizes, or at least evenly distributes, the load on the VIMs 120a:120N where the VNFs 110a:110M are instantiated.

In further detail, this method enables the load on the different VIM to be minimized, or at least evenly distributed on each VIM and across VIMs 120a:120N, not only during instantiation, but also during other lifecycle management operations such as large-scale operations, for example when one or more new VMs, VNFs 110a:110M, and/or VIMs 120a:120N are added to the communication network 1000.

Embodiments relating to further details of migration in a communication network 100 of VNFs 110a:110M to VIMs 120a:120N as performed by the migration controller 200 will now be disclosed.

Figure 3:
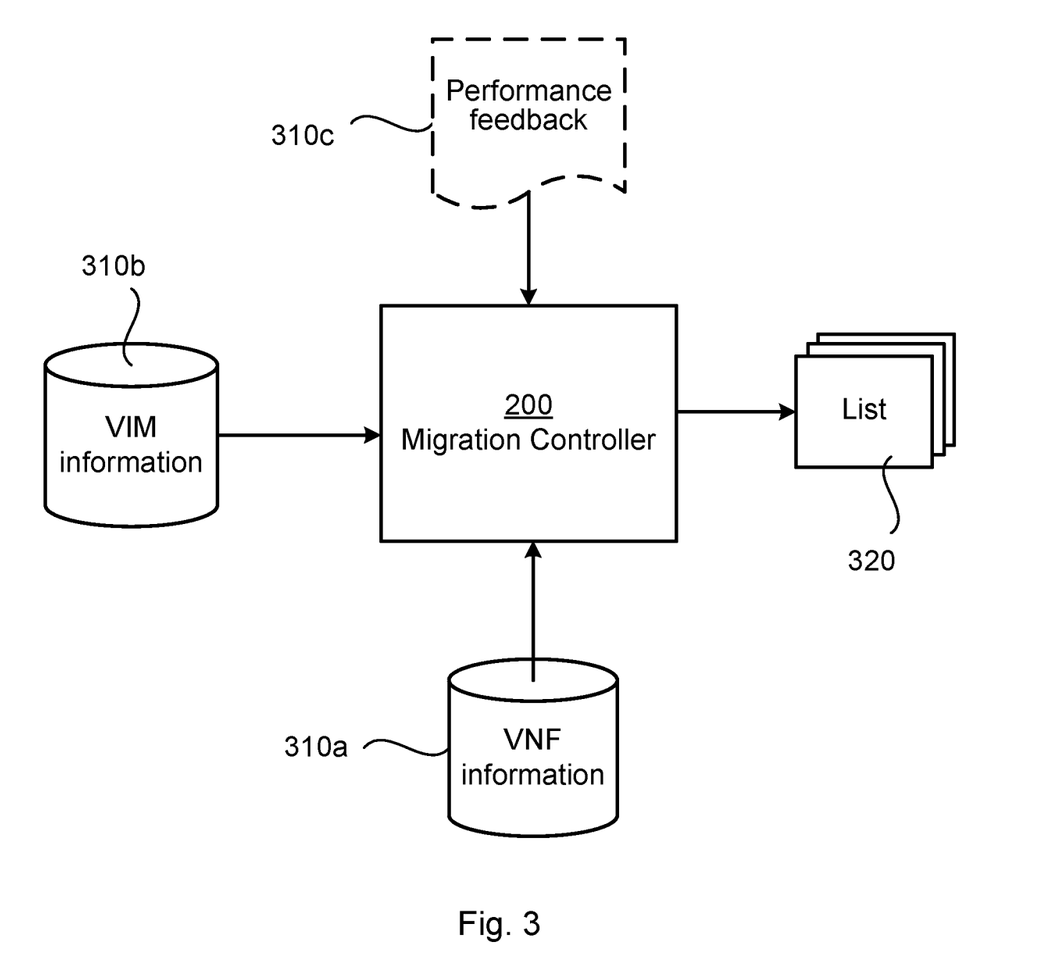
FIGS. 3 and 4 schematically illustrates a migration controller according to embodiments.

Intermediate reference is here made to FIG. 3. FIG. 3 schematically illustrates the migration controller 200a and entities operatively connected to the migration controller 200. The migration controller 200 is operatively connected to a VNF database 310a holding information about the VNFs 110a:110M, to a VIM database 310b holding information about the VIMs 120a:120N, and to an optional performance feedback record 310c holding performance feedback. The migration controller 200 using input from the databases 310a, 310b (as in S102 and S104) and optionally the performance feedback record 310c (as in optional S114 below) provides a list 320 (as in S106) according to which migration of the VNFs 110a:110M to the VIMs 120a:120N is to be initiated.

The VNF database 310a might hold information about network complexity per VNF and about VM usage per VNF. The information about network complexity per VNF and/or about VM usage per VNF might be defined by VNF Descriptions (VNFDs). The VNFDs might be registered in VNF Records (VNFRs). The VNFRs might be stored by one or more Network Function Virtualization Orchestrators (NFVOs). The VIM database 310b might hold information about processing capacity of compute nodes per VIM.

There may be different ways to perform the matching in S106. Aspects, embodiments, and examples relating thereto will now be disclosed.

According to an embodiment, the matching comprises matching the VNFs 110a:110M in order from highest to lowest network complexity and in order from highest to lowest VM usage to the VIMs 120a:120N in order from highest/fastest to lowest/slowest processing capacity of their compute nodes. Each VNF only is matched to any of those VIMs 120a:120N where that VNF is instantiable. In other words, assume that the VNFs 110a:110M firstly are ordered from highest network complexity to lowest network complexity, and that the VNFs 110a:110M secondly are ordered from highest VM usage to lowest VM usage, and that the VIMs 120a:120N are ordered from highest/fastest processing capacity of their compute nodes to lowest/slowest processing capacity of their compute nodes. Then, those VNFs 110a:110M with high network complexity and high VM usage can be matched with, and migrated to, those VIMs 120a:120N with high/fast processing capacity, and so on, under the condition that each VNF only is matched to a VIM where the VNF is instantiable.

In some examples the VNFs 110a:110M and/or the VIMs 120a:120N are associated with weighting factors that are used during the matching in S106. For example, there might be one weighting factor per each VNF with respect to network complexity. That is, according to an embodiment, according to the information of network complexity per VNF a respective network complexity weighting factor is assigned to each VNF according to the network complexity of that VNF. For example, there might be one weighting factors per VNF with respect to VM usage. That is, according to an embodiment, according to the information of VM usage per VNF a respective usage weighting factor is assigned to each VNF according to the VM usage of that VNF. For example, there might be one weighting factor per each VIM with respect to processing capacity. That is, according to an embodiment, according to the information of processing capacity of compute nodes per VIM a respective processing weighting factor is assigned to each VIM according to the processing capacity of the compute nodes of that VIM. The matching in S106 might then involve matching the weighting factors. That is, according to an embodiment, matching the information of network complexity per VNF and the information of VM usage per VNF to the information of processing capacity of compute nodes per VIM as in S106 involves matching the network complexity weighting factors and the usage weighting factors to the processing weighting factors. Using weighting factors could resolve issues that might occur when the ordering of the VNFs 110a:110M from highest network complexity to lowest network complexity, does not correspond to the ordering of the VNFs 110a:110M from highest VM usage to lowest VM usage.

In some aspects, the different pieces of information as obtained in S102 are provided in lists. The information of network complexity per VNF might be provided in a first list of VNFs 110a:110M according to which the VNFs 110a:110M are ordered according to the network complexity per VNF. The information of VM usage per VNF might be provided in a second list of VNFs 110a:110M according to which the VNFs 110a:110M are ordered according to the VM usage per VNF. The information of processing capacity of compute nodes per VIM might be provided in a third list of VIMs 120a:120N according to which the VIMs 120a:120N are ordered according to the processing capacity of the compute nodes per VIM. The matching in S106 might then be based on matching the lists. That is, according to an embodiment, ordering the VNFs 110a:110M in the list comprises ordering the VNFs 110a:110M in a fourth list by matching the first list and the second list to the third list and taking into account the mapping between the VNFs 110a:110M and the VIMs 120a:120N.

There could be different examples of network complexity, VM usage, and processing capacity. In some examples, the information about the network complexity pertains to at least one of: network policies, network traffic patterns, network topology of each VNF. In some examples, the VM usage pertains to at least one of: number of hosted VMs, complexity required by hosted VMs, processing intensity required by hosted VMs. In some examples, the processing capacity pertains to at least one of: number of processing units of the compute nodes, type of processing units of the compute nodes, computing speed of the compute nodes.

There could be different examples of lists. In some examples the list is used as input to one or more batch control functions. That is, according to an embodiment, the list defines content of a batch file that, as part of initiating the migration, is provided to at least one batch control function. In some examples the list is used as input to one or more Congress drivers. That is, according to an embodiment, the list defines content of a rule file that, as part of initiating the migration, is provided to at least one Congress driver.

There might be different actions to take once the VNFs 110a:110M have been migrated to the VIMs 120a:120N according to the list.

In some aspects, the VNFs 110a:110M as migrated are actually deployed. Hence, according to an embodiment, the migration controller 200 is configured to perform (optional) action S110:

S110: The migration controller 200 deploys, or at least initiates such deployment, the VNFs 110a:110M at those VIMs 120a:120N the VNFs 110a:110M have been migrated to.

In other aspects, the VNFs 110a:110M as migrated are not deployed. Hence, according to an embodiment, the migration is initiated without deployment of the VNFs 110a:110M at the VIMs 120a:120N.

Further, in scenarios where the VNFs 110a:110M as migrated are not actually deployed, simulated deployment might still be performed. Hence, according to an embodiment, the migration controller 200 is configured to perform (optional) action S112:

S112: The migration controller 200 simulates deployment of the VNFs 110a:110M at those VIMs 120a:120N the VNFs 110a:110M have been migrated to. In this respect, the simulations need not to be performed at the VIMs 120a:120N but can be performed using other computational resources.

Regardless whether the VNFs 110a:110M as migrated are actually deployed or not, in some aspects, performance feedback is collected from the VIMs 120a:120N regarding either the actual deployment or the simulated deployment of the VNFs 110a:110M. Hence, according to an embodiment, the migration controller 200 is configured to perform (optional) action S114:

S114: The migration controller 200 obtains performance feedback from those VIMs 120a:120N the VNFs 110a:110M have been migrated to.

The performance feedback might be obtained from the performance feedback block 310e.

Action S114 might be entered either upon either action S110 or action S112 having been performed. The performance feedback might pertain to information of experienced or simulated network complexity per VNF, information of experienced or simulated VM usage per VNF, and/or information of experienced or simulated processing capacity of compute nodes per VIM.

The VNFs 110a:110M might then be re-ordered according to the performance feedback. Thus, according to an embodiment, the migration controller 200 is configured to perform (optional) action S116:

S116: The migration controller 200 re-orders the VNFs 110a:110M in the list according to the performance feedback before re-initiating migration of the VNFs 110a:110M to the VIMs 120a:120N in the order defined by the thus re-ordered list.

In some aspects, S116 involves the same operations as in S106 but where the performance feedback is used. That is, upon completion of the re-ordering if the VNFs 110a:110M in the list according to the performance feedback, action S108 might again be entered in order for the VNFs 110a:110M to be migrated to the VIMs 120a:120N in the order defined by the thus re-ordered list.

Re-ordering the VNFs 110a:110M in the list causes at least some of the VNFs 110a:110M to be migrated to other VIMs 120a:120N than they were migrated to according to the original order as used when initiating the migration in action S108. One reason for re-ordering the VNFs 110a:110M might be that the performance feedback indicate that some VIMs 120a:120N are underutilized whereas other VIMs 120a:120N are overutilized in terms of load, processing time, etc., and thus where the load processing time etc. is not equalized among the VIMs 120a:120N. In some examples the performance feedback therefore comprises prioritized VIM-VNF combinations (i.e., examples of which VNFs 110a:110M should be matched to which VIMs 120a:120N).

Figure 4:
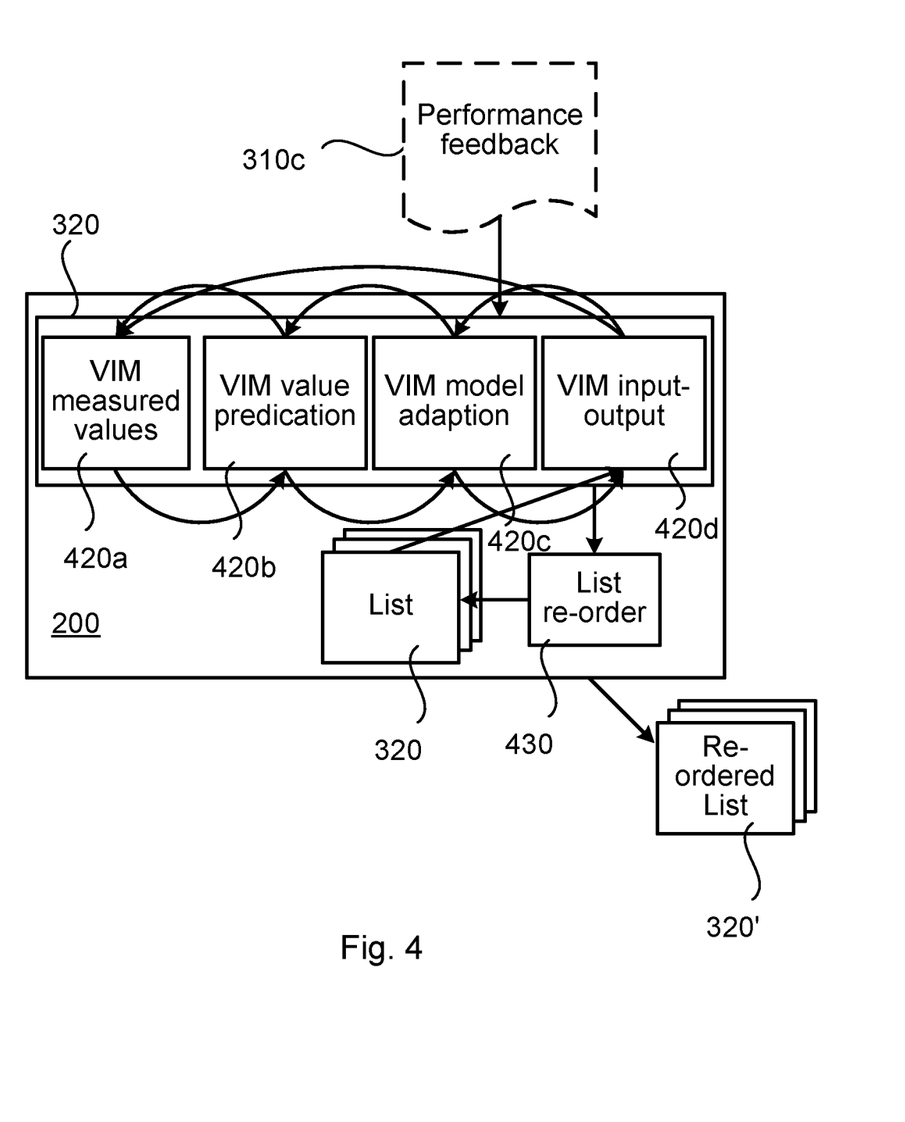

Reference is here made to FIG. 4. FIG. 4 schematically illustrates an embodiment where the migration controller 200 comprises a learning block 410 configured to obtain performance feedback from the performance feedback record 310c. As above, the performance feedback might either original from actual deployment of the VNFs 110a:110M or from simulated deployment of the VNFs 110a:110M. In turn, the learning block 410 comprises a VIM measured values block 420a, a VIM value prediction block 420b, a VIM model adaption block 420c, and a VIM input/output block 420d. The learning block 410 might implement machine learning of a model of the VIM behavior and uses the performance feedback to output an updated matching between VNFs 110a:110M and VIMs 120a:120N. The output might be a list of prioritized VIM-VNF combinations. In order to do so the learning block 410 might be configured to update any of the above-mentioned weighting factors. The VIM measured values block 420a is configured to obtain current values of the VIM from the performance feedback. The VIM value prediction block 420b is configured to predict future values of the VIM. The VIM model adaption block 420c is configured to adapt the model of the VIM behavior. The VIM input/output block 420d is configured to define the inputs and outputs of the thus adapted model of the VIM behavior. In some aspects, iterations, using different chunks of performance feedback, are performed over the VIM measured values block 420a, the VIM value prediction block 420b, the VIM model adaption block 420c, and the VIM input/output block 420d until a best fit is achieved. The learning block 410 is connected to a list re-order block 430 that based on the output from the learning block 410 re-orders the list 320 to produce a re-ordered list 320'.

An embodiment of a method for migration in a communication network 100 of VNFs 110a:110M to VIMs 120a:120N as performed by the migration controller 200 based on at least some of the above disclosed embodiments will now be disclosed.

A1: The migration controller 200, for each VNF and from the from the VNFR, identifies the networks connected to that VNF.

A2: The migration controller 200 look up the networks (in the network record in the NFVO, or by checking the network in the VIM), and determine their extent and what other entities are connected to each network.

A3: The migration controller 200 orders the VNFs 110a:110M in a first list in order from most complex network to least complex network.

A4: The migration controller 200, for each VNF, identifies the type of VNF from the Virtual Network Function Description (VNFD), which is registered in the VNFR. The VNFD describes all instantiation parameters for each VNF and might be kept by, or made accessible by, the NFVO.

A5: The migration controller 200 uses the VNFD as input to order the VNFs 110a:110M in a second list from those VNFs 110a:110M having the most VM to those VNFs 110a:110M having the fewest VMs, and/or from those VNFs 110a:110M having the most complex and/or processing intensive VMs to those VNFs 110a:110M having the least complex and/or processing intensive VMs.

A6: The migration controller 200 obtains information of the configuration of each VIM either by querying the VIM or querying the VIM record in the NFVO. This will provide information about the processing abilities of each VIM; i.e. a VIM where the virtual controllers (vCIC) are deployed on 386 processors with one single core will perform slower than a VIM where the vCIC are deployed on multi-core Itanium processors.

A7: The migration controller 200 orders the VIMs 120a:120N in a third list from those VIMs 120a:120N having highest/fastest processing capacity to those VIMs 120a:120N having lowest/slowest processing capacity.

A8: The migration controller 200 obtains information about which VNFs 110a:110M are instantiable at which VNFs 110a:110M. The VNF are ordered according to the VIM where they could be instantiated according to the NFVO.

A9: The migration controller 200 collates the first list, the second list, and the third list with the information about which VNFs 110a:110M are instantiable at which VNFs 110a:110M.

A9: The list determined in A9 is used to create a list of which VNFs 110a:110M to be migrated to each VIM, and in which order such migration is to take place (i.e., from the VNF to be migrated first to the VNF to be migrated last).

Figure 5:
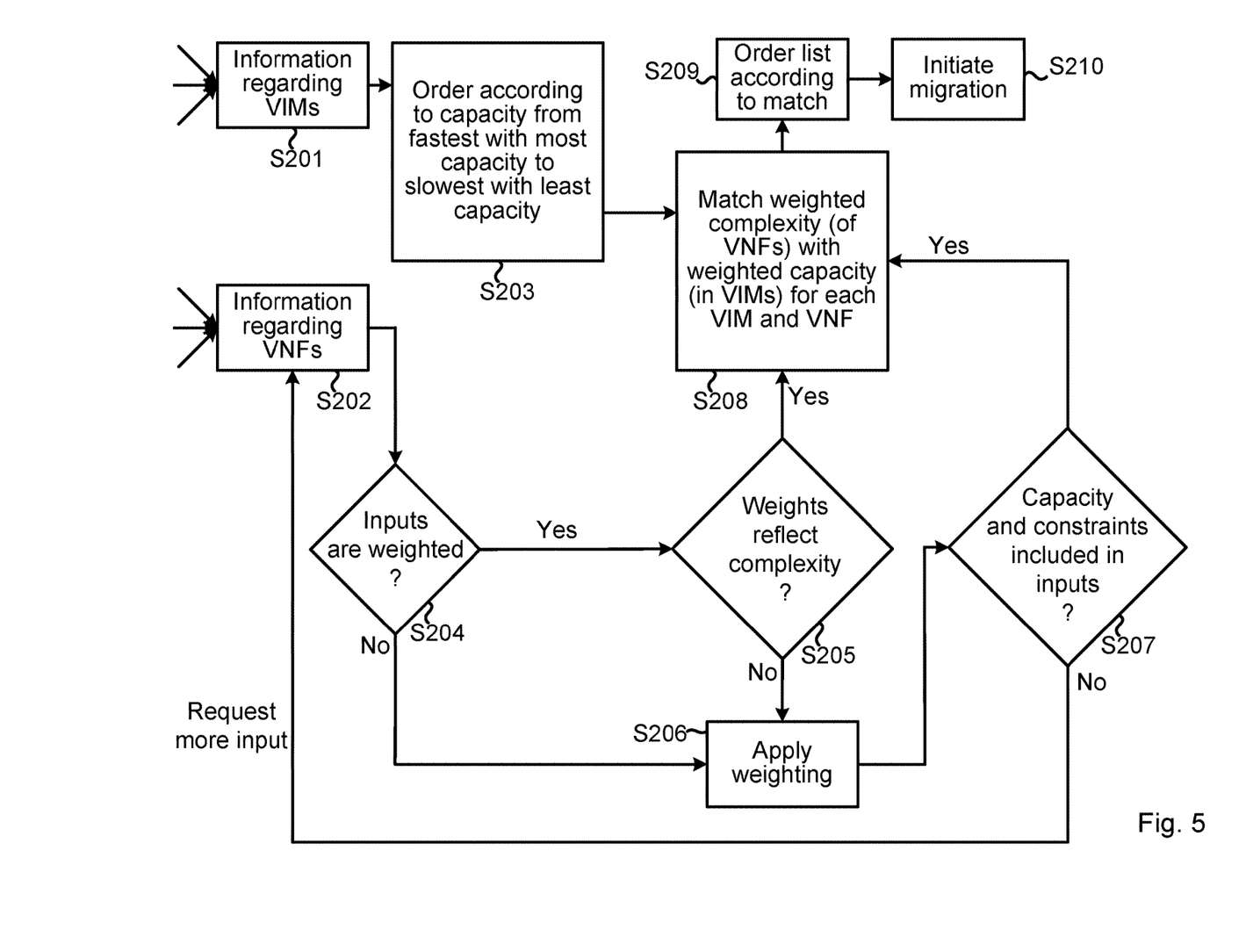

Reference is now made to FIG. 5. FIG. 5 is a flowchart illustrating an embodiment of a method for migration in a communication network 100 of VNFs 110a:110M to VIMs 120a:120N as performed by the migration controller 200 based on at least some of the above disclosed embodiments.

Information regarding the VIMs 120a:120N and information regarding the VNFs 110a:110M is obtained (S201, S202) as respective inputs. The VIMs 120a:120N are ordered according to processing capacity from highest/fastest processing capacity to lowest/slowest processing capacity (S203). It is checked if the VNFs 110a:110M are associated with weighting factors (S204) and if so, if the weighting factors reflect complexity of the networks of the VNFs 110a:110M (S205). Otherwise, such weighting factors are applied (S206). These weighting factors are structured to reflect the complexity of the of the networks, for example such that a single root input/output virtualization (SR-IOV) network has higher weighting factor than an ordinary network, since it takes more time and resources to create an SR-IOV network. The weighting factors are either applied as part of the inputs themselves, or derived from known network complexities.

The available capacity and performance of the virtualization environments are compared with the complexity of the operations requested (S207). A slow VIM with old processors and little memory will not be able to perform actions at the same speed as a VIM with modern processors and large memory capacity. On the other hand, the operation to create a VM is fairly quick, but the creation of a VM with several attached virtual network interface cards (VNIC) and different virtual networks (VN) attached to them takes more time. The complexity is further enhanced by specialized functions, such as the use of SR-IOV for networking, which is more complex to implement than simple networks.

The collated capacities of the VNFs are matched with the weighted list of the VIMs (S208).

The list is ordered (S209) from the inputs so that different operations can be appropriately sequenced. For example, if a virtualization environment operates with batches of commands, all creations of networks can be grouped together, and all VM creations grouped together, etc. But if the virtualization environment which is the target of the batch operation operates in a sequential fashion, the list can be ordered according to dependencies, i.e. first a network is created, then all VMs which are dependent on it are created, then a second network and the VMs which are dependent on that second network are created, and so on. The derived command sequence is according to the ordered list structured to what is most appropriate for the target virtualization environment.

Migration is initiated (S210) according to the ordered list. If the ordered list is to be provided to a Congress system, it is provided to the Congress driver, whereas if the ordered list is directed at a specific virtualization environment directly, it is provided to that virtualization environment in an appropriate way.

Figure 6:
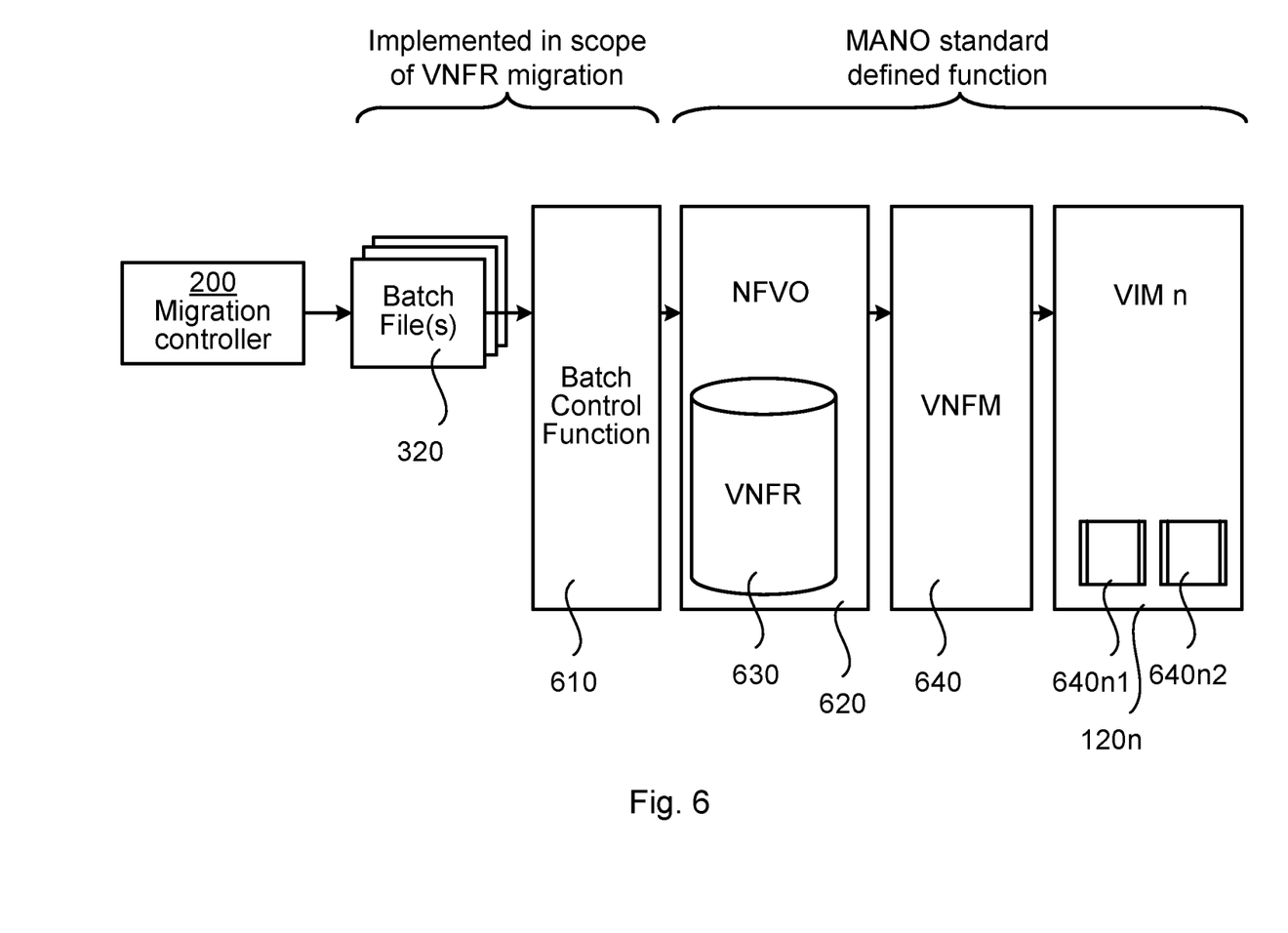
FIG. 6 schematically illustrates a migration controller configured to provide list as a batch file to a batch control function according to an embodiment.
Figure 7:
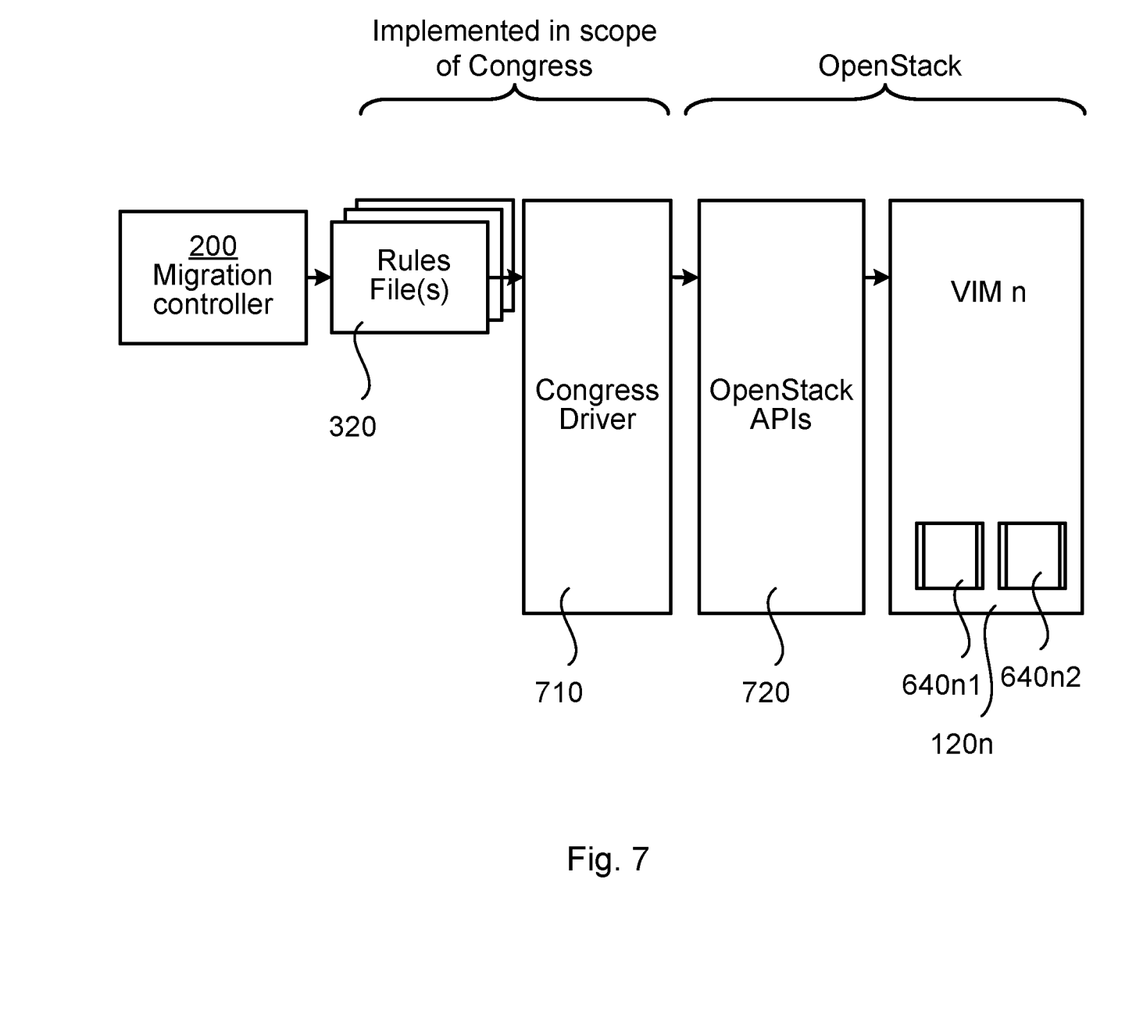
FIG. 7 schematically illustrates a migration controller configured to provide a list as a rule file to a Congress driver according to an embodiment.

Reference is now made to FIG. 6 and FIG. 7 where the list is used as input to a batch control function and a Congress driver, respectively.

FIG. 6 schematically illustrates an embodiment where the migration controller 200 provides the list 320 as a batch file to a batch control function 610. The batch control function 610 is in turn operatively connected to an NFVO 620 that holds a VNFR 630. In turn, the NFVO 620 is operatively connected to a Virtualized Network Functions Manager (VNFM) 640 which in turn is operatively connected to at least some of the VIMs 120a:120N, here represented by VIM 120n having two VIM instances 640n1, 640n2. The batch file is input to the batch control function 610 and then used in the management of the interaction with the VIM 120n. The batch control function 610 interacts with the NFVO 620 that is controlling the placement of the VNFs 110a:110M in the virtualized infrastructure. The NFVO 620 requests the creation of one or more VNFs 110a:110M from the VNFM 640 which interacts with one or more VIMs. A Network Service (NS) is in the Management and Orchestration (MANO) standard defined as a combination of VNFs which span multiple VIMs.

FIG. 7 schematically illustrates an embodiment where the migration controller 200 provides the list 320 as a rule file to a Congress driver 710. The Congress driver 710 is in turn operatively connected to an NFVO 720 that holds a VNFR 730. In turn, the NFVO 720 is operatively connected to OpenStack Application Programming Interfaces (APIs; Neutron, Nova, etc.) 720 which in turn is operatively connected to at least some of the VIMs 120a:120N, here represented by VIM 120n having two VIM instances 740n1, 740n2. The rule file is input to the Congress driver 710 and then used in the management of the interaction with the VIM 120n. The Congress driver 710 interacts with the OpenStack APIs 720 that is controlling the placement of the VNFs 110a:110M in the virtualized infrastructure.

Figure 8:
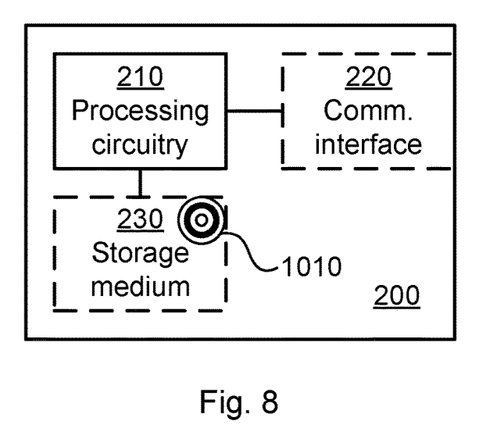
FIG. 8 is a schematic diagram showing functional units of a migration controller according to an embodiment.

FIG. 8 schematically illustrates, in terms of a number of functional units, the components of a migration controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the migration controller 200 to perform a set of operations, or actions, as disclosed above. For example, the storage medium 230 may store the set of operations, and the processing circuitry 210 may be configured to retrieve the set of operations from the storage medium 230 to cause the migration controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The migration controller 200 may further comprise a communications interface 220 at least configured for communications with those entities as disclosed in FIGS. 1, 3, 4, 6, 7. As such the communications interface 220 may comprise one or more transmitters and receivers, comprising analogue and digital components. The processing circuitry 210 controls the general operation of the migration controller 200 e.g. by sending data and control signals to the communications interface 220 and the storage medium 230, by receiving data and reports from the communications interface 220, and by retrieving data and instructions from the storage medium 230. Other components, as well as the related functionality, of the migration controller 200 are omitted in order not to obscure the concepts presented herein.

Figure 9:
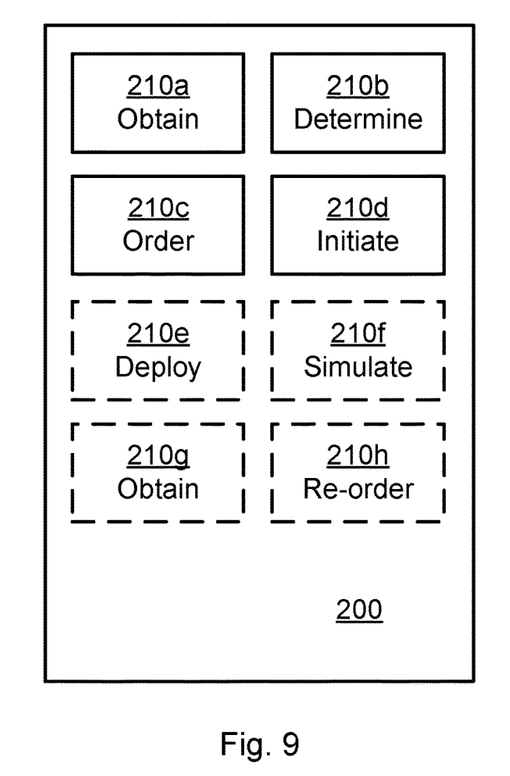
FIG. 9 is a schematic diagram showing functional modules of a migration controller according to an embodiment.

FIG. 9 schematically illustrates, in terms of a number of functional modules, the components of a migration controller 200 according to an embodiment. The migration controller 200 of FIG. 9 comprises a number of functional modules; an obtain module 210a configured to perform action S102, a determine module 210b configured to perform action S104, an order module 210C configured to perform action S106, and an initiate module 210d configured to perform action S108. The migration controller 200 of FIG. 9 may further comprise a number of optional functional modules, such as any of a deploy module 210e configured to perform action S110, a simulate module 21 of configured to perform action S112, an obtain module 210g configured to perform action S114, and a re-order module 210h configured to perform action S116.

In general terms, each functional module 210a-210h may in one embodiment be implemented only in hardware and in another embodiment with the help of software, i.e., the latter embodiment having computer program instructions stored on the storage medium 230 which when run on the processing circuitry makes the migration controller 200 perform the corresponding actions mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any actions as disclosed herein.

The migration controller 200 may be provided as a standalone device or as a part of at least one further device. A first portion of the instructions performed by the migration controller 200 may be executed in a first device, and a second portion of the of the instructions performed by the migration controller 200 may be executed in a second device; the herein disclosed embodiments are not limited to any particular number of devices on which the instructions performed by the migration controller 200 may be executed. Hence, the methods according to the herein disclosed embodiments are suitable to be performed by a migration controller 200 residing in a cloud computational environment. Therefore, although a single processing circuitry 210 is illustrated in FIG. 8 the processing circuitry 210 may be distributed among a plurality of devices, or nodes. The same applies to the functional modules 210a-210h of FIG. 9 and the computer program 1020 of FIG. 10.

Figure 10:
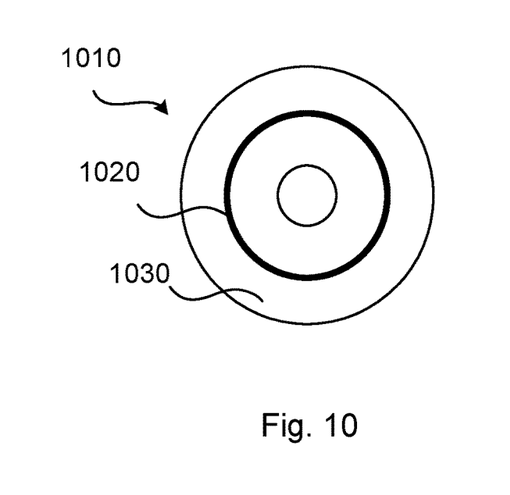
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any actions as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by a migration controller for migration in a communication network of virtual network functions, VNFs, to virtual infrastructure managers, VIMs, each VIM being associated with a virtualized infrastructure provided by at least one computing node, the method comprising:

obtaining, at least by querying at least one database, information of network complexity per VNF, information of virtual machine, VM, usage per VNF, and information of processing capacity of compute nodes per VIM;

determining, by processing circuitry of the migration controller, a mapping between the VNFs and the VIMs, wherein the mapping defines at which of the VIMs each of the VNFs is instantiable;

ordering the VNFs in a list by matching the information of network complexity per VNF and the information of VM usage per VNF to the information of processing capacity of compute nodes per VIM and taking into account the mapping between the VNFs and the VIMs; and causing the VNFs to be migrated to the VIMs in the order defined by the list.

2. The method according to claim 1, wherein according to the information of network complexity per VNF a respective network complexity weighting factor is assigned to each VNF according to the network complexity of that VNF.

3. The method according to claim 1, wherein according to the information of VM usage per VNF a respective usage weighting factor is assigned to each VNF according to the VM usage of that VNF.

4. The method according to claim 1, wherein according to the information of processing capacity of compute nodes per VIM a respective processing weighting factor is assigned to each VIM according to the processing capacity of the compute nodes of that VIM.

5. The method according to claim 1, wherein matching the information of network complexity per VNF and the information of VM usage per VNF to the information of processing capacity of compute nodes per VIM involves matching the network complexity weighting factors and the usage weighting factors to the processing weighting factors.

6. The method according to claim 1, wherein information about the network complexity pertains to at least one of: network policies, network traffic patterns, network topology.

7. The method according to claim 1, wherein the VM usage pertains to at least one of: number of hosted VMs, complexity required by hosted VMs, processing intensity required by hosted VMs.

8. The method according to claim 1, wherein processing capacity pertains to at least one of: number of processing units of the compute nodes, type of processing units of the compute nodes, computing speed of the compute nodes.

9. The method according to claim 1, further comprising: deploying the VNFs at those VIMs the VNFs have been migrated to.

10. The method according to claim 9, further comprising: obtaining performance feedback from those VIMs the VNFs have been migrated to; and re-ordering the VNFs in the list according to the performance feedback before re-initiating migration of the VNFs to the VIMs in the order defined by the thus re-ordered list.

11. The method according to claim 10, wherein the performance feedback comprises prioritized VIM-VNF combinations.

12. The method according to claim 1, wherein the migration is initiated without deployment of the VNFs at the VIMs.

13. The method according to claim 12, further comprising:
simulating deployment of the VNFs at those VIMs the VNFs have been migrated to.

14. The method according to claim 1, wherein the list defines content of one of:

a batch file that, as part of initiating the migration, is provided to at least one batch control function; and
a rule file that, as part of initiating the migration, is provided to at least one Congress driver.

15. The method according to claim 1, wherein the information of network complexity per VNF is provided in a first list of VNFs according to which the VNFs are ordered according to the network complexity per VNF.

16. The method according to claim 1, wherein the information of VM usage per VNF is provided in a second list of VNFs according to which the VNFs are ordered according to the VM usage per VNF.

17. The method according to claim 1, wherein the information of processing capacity of compute nodes per VIM is provided in a third list of VIMs according to which the VIMs are ordered according to the processing capacity of the compute nodes per VIM.

18. The method according to claim 1, wherein the matching comprises matching the VNFs in order from highest to lowest network complexity and in order from highest to lowest VM usage to the VIMs in order from highest to lowest processing capacity of their compute nodes, and wherein each VNF only is matched to any of those VIMs where that VNF is instantiable.

19. A migration controller for migration in a communication network of virtual network functions, VNFs, to virtual infrastructure managers, VIMs, each VIM being associated with a virtualized infrastructure provided by at least one computing node, the migration controller comprising processing circuitry, the processing circuitry being configured to cause the migration controller to:

obtain, at least by querying at least one database, information of network complexity per VNF, information of virtual machine, VM, usage per VNF, and information of processing capacity of compute nodes per VIM;

determine a mapping between the VNFs and the VIMs, wherein the mapping defines at which of the VIMs each of the VNFs is instantiable;

order the VNFs in a list by matching the information of network complexity per VNF and the information of VM usage per VNF to the information of processing capacity of compute nodes per VIM and taking into account the mapping between the VNFs and the VIMs; and causing the VNFs to be migrated to the VIMs in the order defined by the list.

20. A computer program for migration in a communication network of virtual network functions, VNFs, to virtual infrastructure managers, VIMs, each VIM being associated with a virtualized infrastructure provided by at least one computing node, the computer program comprising computer code which, when run on processing circuitry of a migration controller, causes the migration controller to:

obtain, at least by querying at least one database, information of network complexity per VNF, information of virtual machine, VM, usage per VNF, and information of processing capacity of compute nodes per VIM;

determine a mapping between the VNFs and the VIMs, wherein the mapping defines at which of the VIMs each of the VNFs is instantiable;

order the VNFs in a list by matching the information of network complexity per VNF and the information of VM usage per VNF to the information of processing capacity of compute nodes per VIM and taking into account the mapping between the VNFs and the VIMs; and cause the VNFs to be migrated to the VIMs in the order defined by the list.

\* \* \* \* \*